United States Patent
Schaefer et al.

(10) Patent No.: US 9,984,592 B2
(45) Date of Patent: May 29, 2018

(54) SYSTEMS, DEVICES, AND METHODS FOR SIMULATING FETAL DELIVERY

(71) Applicant: MUSIC FOUNDATION FOR RESEARCH DEVELOPMENT, Charleston, SC (US)

(72) Inventors: John J. Schaefer, Mount Pleasant, SC (US); Carol L. Simmons, Mount Pleasant, SC (US)

(73) Assignee: MUSC FOUNDATION FOR RESEARCH DEVELOPMENT, Charleston, SC (US)

( * ) Notice: Subject to any disclaimer, the term of this patent is extended or adjusted under 35 U.S.C. 154(b) by 565 days.

(21) Appl. No.: 14/369,241

(22) PCT Filed: Jan. 4, 2013

(86) PCT No.: PCT/US2013/020289
§ 371 (c)(1),
(2) Date: Jun. 27, 2014

(87) PCT Pub. No.: WO2013/103818
PCT Pub. Date: Jul. 11, 2013

(65) Prior Publication Data
US 2015/0024365 A1    Jan. 22, 2015

Related U.S. Application Data

(60) Provisional application No. 61/583,417, filed on Jan. 5, 2012.

(51) Int. Cl.
*G09B 23/28* (2006.01)

(52) U.S. Cl.
CPC .................................. *G09B 23/281* (2013.01)

(58) Field of Classification Search
USPC ........................................................ 434/273
See application file for complete search history.

(56) References Cited

U.S. PATENT DOCUMENTS

| | | | |
|---|---|---|---|
| 2007/0122785 A1 | 5/2007 | Eggert et al. | |
| 2008/0138778 A1* | 6/2008 | Eggert | G06F 19/3437 434/262 |
| 2010/0086906 A1 | 4/2010 | Allen et al. | |

FOREIGN PATENT DOCUMENTS

| FR | 2554360 A | 5/1985 |
|---|---|---|
| WO | 2002001536 A1 | 1/2002 |
| WO | 2003001482 A2 | 1/2003 |
| WO | 2003041034 A1 | 5/2003 |
| WO | 2011073407 A1 | 6/2011 |

OTHER PUBLICATIONS

International Search Report and Written Opinion in related application PCT/US2013/020289, dated Apr. 25, 2013.
Communication pursuant to Article 94(3) EPC, issued by the European Patent Office on Jun. 16, 2016, in connection with corresponding European Application No. EP13733759.8.
Office Action issued in related Japanese Application No. 2014-551339 on Jan. 30, 2017.

* cited by examiner

*Primary Examiner* — Kesha Frisby
(74) *Attorney, Agent, or Firm* — Meunier Carlin & Curfman LLC

(57) ABSTRACT

The present application relates to systems, methods, and devices for simulating the delivery of a fetus.

10 Claims, 11 Drawing Sheets

SYSTEMS, DEVICES, AND METHODS FOR SIMULATING FETAL DELIVERY

CROSS-REFERENCE TO RELATED APPLICATION

This application claims the benefit of U.S. Provisional Patent Application No. 61/583,417, filed on Jan. 5, 2012, entitled "Systems, Devices, and Methods for Simulating Fetal Delivery," the disclosure of which is expressly incorporated herein by reference in its entirety.

TECHNICAL FIELD

This present application relates to systems, devices, and methods for simulating fetal delivery.

BACKGROUND

Obstetric emergencies cause damage and death to mothers and babies. These emergencies require quick, decisive, and effective action.

SUMMARY

Provided are systems, devices and methods for simulating fetal delivery. The details of one or more embodiments of the invention are set forth in the accompanying drawings and the description below. Other features, objects, and advantages of the invention will be apparent from the description and drawings, and from the claims.

Provided herein is a fetal delivery simulator system (FDSS). An example FDSS includes a conduit sized to allow passage of a model fetus. The system further includes a pneumatic actuator configured to advance the model fetus through the conduit.

Optionally, the system includes a cradle for securing the model fetus. The outer circumferential dimension of the cradle is optionally less than the inner circumferential dimension of the conduit. The pneumatic actuator can be operatively connected to the cradle. Optionally, activation of the pneumatic actuator causes the cradle to slidably advance through the conduit.

Optionally, the distal end of the conduit is attachable to a pelvic outlet of an obstetrical simulator such that the fetal model advances through the conduit and can be delivered through the pelvic outlet. Optionally, the distal end of the conduit is in proximity to a pelvic outlet of an obstetrical simulator. When the pneumatic actuator is activated, the pneumatic actuator can advance the fetus towards the pelvic outlet of the obstetrical simulator. The fetus can then be delivered from the pelvic outlet.

Optionally, the conduit comprises a tracking slot. The tracking slot has a predetermined length and shape along the length of the conduit. Optionally, the cradle further comprises a tracking protrusion that is configured to extend into the tracking slot when the cradle is positioned within the conduit.

The advancement of the fetus through the conduit by activation of the pneumatic actuator optionally causes the tracking protrusion to advance through the tracking slot. Advancement of the cradle through the conduit while the tracking protrusion is positioned in the tracking slot causes rotational movement of the cradle relative to the conduit. Optionally, the fetus is held by the cradle such that the fetus rotates with the cradle relative to the conduit. Optionally, as the cradle moves through the conduit and the cradle and fetus rotate relative to the conduit, the shoulders of the fetus rotate from the 3 o'clock and 9 o'clock positions to the 12 o'clock and 6 o'clock positions.

The example system can further comprise a sensor that is configured to sense the position of the fetus within the conduit. Optionally, a processing system is in operative communication with the sensor. Moreover, the processing system optionally includes a pneumatic actuator control module. The pneumatic actuator control module is in operative communication with the pneumatic actuator to control activation of the pneumatic actuator.

By sensing the position of the fetus and controlling the pneumatic actuator, the processing system is optionally configured to stop activation of the pneumatic actuator when the fetus is advanced to or beyond a predetermined position relative to the conduit.

Also provided is a fetal delivery simulator system including a tubular conduit sized to allow passage of a model fetus. The tubular conduit includes a tracking slot extending from an interior surface of the tubular conduit to an exterior surface of the tubular conduit and having a predetermined longitudinal and curving path. The system further includes a cradle for securing the model fetus. The cradle has an outer circumferential dimension that is less than the inner circumferential dimension of the tubular conduit. The cradle further includes a tracking protrusion that is configured to extend into the tracking slot when the cradle is positioned within the tubular conduit. The system further has an actuator configured to advance the model fetus and cradle through the tubular conduit.

Optionally, the actuator is pneumatic. Optionally, advancement of the fetus through the conduit by activation of the actuator causes the tracking protrusion to advance through the tracking slot. Advancement of the cradle through the conduit while the tracking protrusion is positioned in the tracking slot causes rotational movement of the cradle relative to the conduit.

The fetus is optionally held by the cradle such that the fetus rotates with the cradle relative to the conduit. For example, as the cradle moves through the conduit and the cradle and fetus rotate relative to the conduit, the shoulders of the fetus rotate from the 3 o'clock and 9 o'clock positions to the 12 o'clock and 6 o'clock positions.

Optionally, the system further includes a tether secured to the fetal model. The tether optionally restricts movement of the fetus through the conduit. In one example, the tether allows delivery of at least a portion of the fetal model head but restricts delivery of the remainder of the fetal model. Optionally, the tether is releasable from the fetal model to allow delivery of the full fetal model.

Also provided is a fetal delivery simulator system including a model fetus. The system also includes a simulated birth canal for passage of the model fetus there through. Further, the system has a tether that is releasably secured to the fetal model. When the tether is secured, the tether prevents delivery of the full model fetus from the simulated birth canal.

Optionally, release of the tether from the fetal model allows delivery of the fetal model from the simulated birth canal. In one example, the tether is configured to withdraw the fetal model at least partially into the birth canal to simulate a turtle sign prior to release of the tether from the fetal model.

Also provided is a device for detecting force delivered to a simulated brachial plexus region of a fetal model with traction of a fetal model during simulated delivery. For example, the device includes a directional sensor system that measures force in the vector of the brachial plexus of the fetal model.

Optionally, the directional sensor system comprises a strain gauge configured for placement at an angle from the neck to the shoulder on a model fetus. Optionally, the directional sensor system comprises a strain gauge configured for placement at an angle from the neck to the shoulder bilaterally on a model fetus.

Also provided is a system for detecting force delivered to a simulated brachial plexus with fraction of a fetal head during simulated delivery. The system includes a device to detect force. Optionally, the system further includes a telemetry system in operative communication with the device to detect force. The telemetry system is configured for transmitting one or more signals representing the detected force measurement. The system further includes a processing system. The processing system receives and processes the detected signal or signals to determine the force delivered to the stimulated brachial plexus in the vector of the brachial plexus.

Also provided is a method for simulating fetal delivery. An example method includes positioning a fetal model in a simulated birth canal. The fetal model is advanced through the simulated birth canal using a pneumatic actuator device.

Also provided is a method for simulating fetal shoulder rotation during delivery. The method includes positioning a fetal model in a cradle. The cradle is positioned within a conduit wherein the conduit comprises a tracking slot having a predetermined length and shape along the length of the conduit. The cradle further includes a tracking protrusion that is configured to extend into the tracking slot when the cradle is positioned within the conduit. The model fetus and cradle are advanced through the conduit to cause rotation of the shoulders of the fetal model.

Also provided is a method for simulating a turtle sign during a simulated delivery. An example method includes positioning a fetal model in a simulated birth canal. A tether is attached to the fetal model. The tether prevents full delivery of the fetal model from the birth canal. Optionally, the tether retracts the fetal model at least partially into the birth canal after tension is created in the tether by pulling the fetal model forward.

DESCRIPTION OF DRAWINGS

Like reference symbols in the various drawings indicate like elements.

DETAILED DESCRIPTION

The present invention now will be described more fully hereinafter with reference to specific embodiments of the invention. Indeed, the invention can be embodied in many different forms and should not be construed as limited to the embodiments set forth herein; rather, these embodiments are provided so that this disclosure will satisfy applicable legal requirements.

Obstetric emergencies are dangerous and can cause damage and death to mothers and babies. During these emergencies, the available staff must react in an efficient and effective manner. To respond appropriately, staff must be trained. Training opportunities, however, are often limited. Current delivery trainers and simulators are expensive and frequently malfunction.

Provided herein are systems, devices and methods to simulate delivery. Such devices, systems and methods can be used, for example, to train individuals on delivery of fetuses, including emergent delivery presentations. For example, provided is a FDSS used to deliver a fetus from stage 1 through stage 3 of labor.

The system can be incorporated as a module into a full scale obstetrical manikin based simulator. The terms fetus and fetal model are used interchangeably and refer, for example, to a fetal model for use with obstetrical manikins These full scale obstetrical manikins provide interactive and dynamic simulation of a birthing female. Furthermore, the full scale models provide the functionality required to train in a wide range of obstetric skills. Example commercial manikins are available from distributors, such as Simuloids and Laerdal.

The FDSS itself is a simulator component that is optionally used within these full scale models. The FDSS may be attached by a flange to the pelvic outlet of an obstetrical full scale manikin simulator, as the Laerdal SimMom® simulator. The FDSS is inserted into the maternal abdomen of the full scale model and mated with the angled pelvic outlet. The FDSS is then covered with the padded gravid abdominal skin of the manikin. With each delivery the abdominal skin may be reflected and the proximal end of the FDSS unscrewed and the fetus reloaded into the cradle for another simulation.

The modular fetal delivery system has optional features that include: 1) a pneumatic based fetus delivery mechanism, 2) a tracked system to simulate fetal shoulder rotation, for example, during stage 2 of labor, 3) a controllable tether system to simulate shoulder dystocia, and 4) a mechanism to simulate the "turtle sign" associated with shoulder dystocia. The example FDSS creates a set of simplified mechanisms with wide manufacturing tolerances to support the manufacturing of a low-cost, reliable, modular fetal delivery simulation system to support high fidelity obstetrical training of physicians and nurses.

Figure 1:
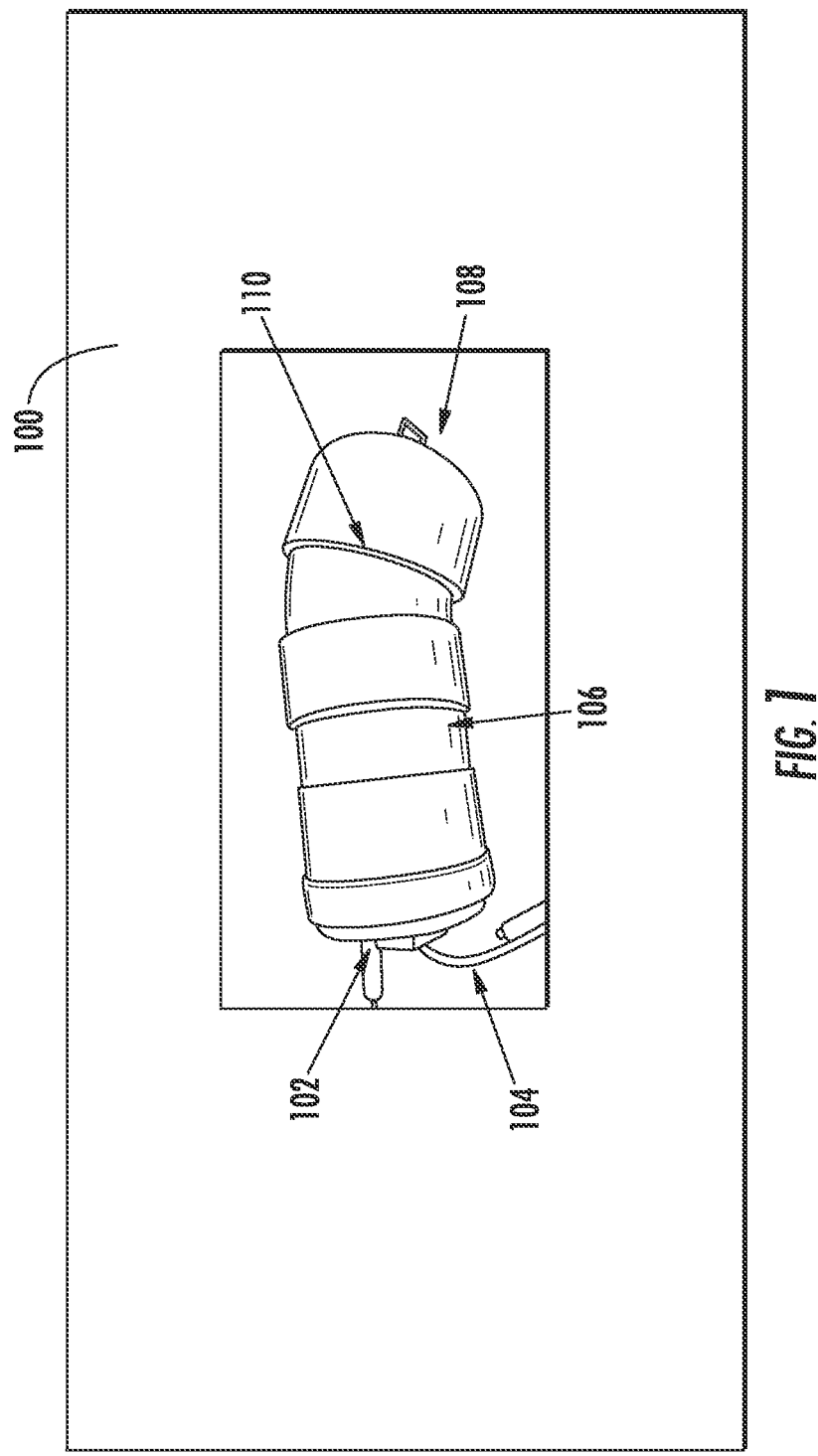
FIG. 1 is a photograph showing an example pneumatic based fetal delivery system.
Figure 2:
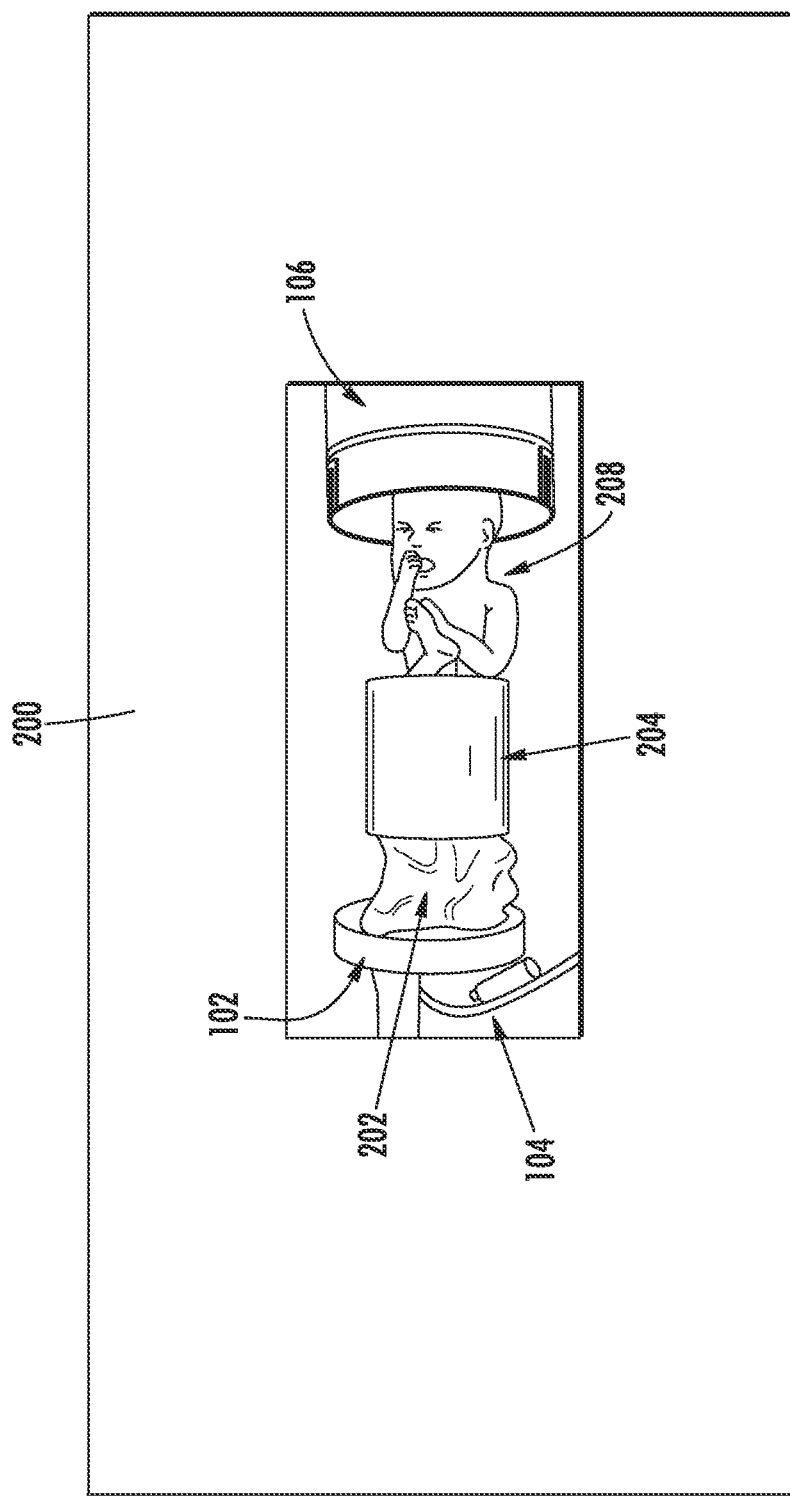
FIG. 2 is a photograph showing an example pneumatic based fetal delivery system.
Figure 4:
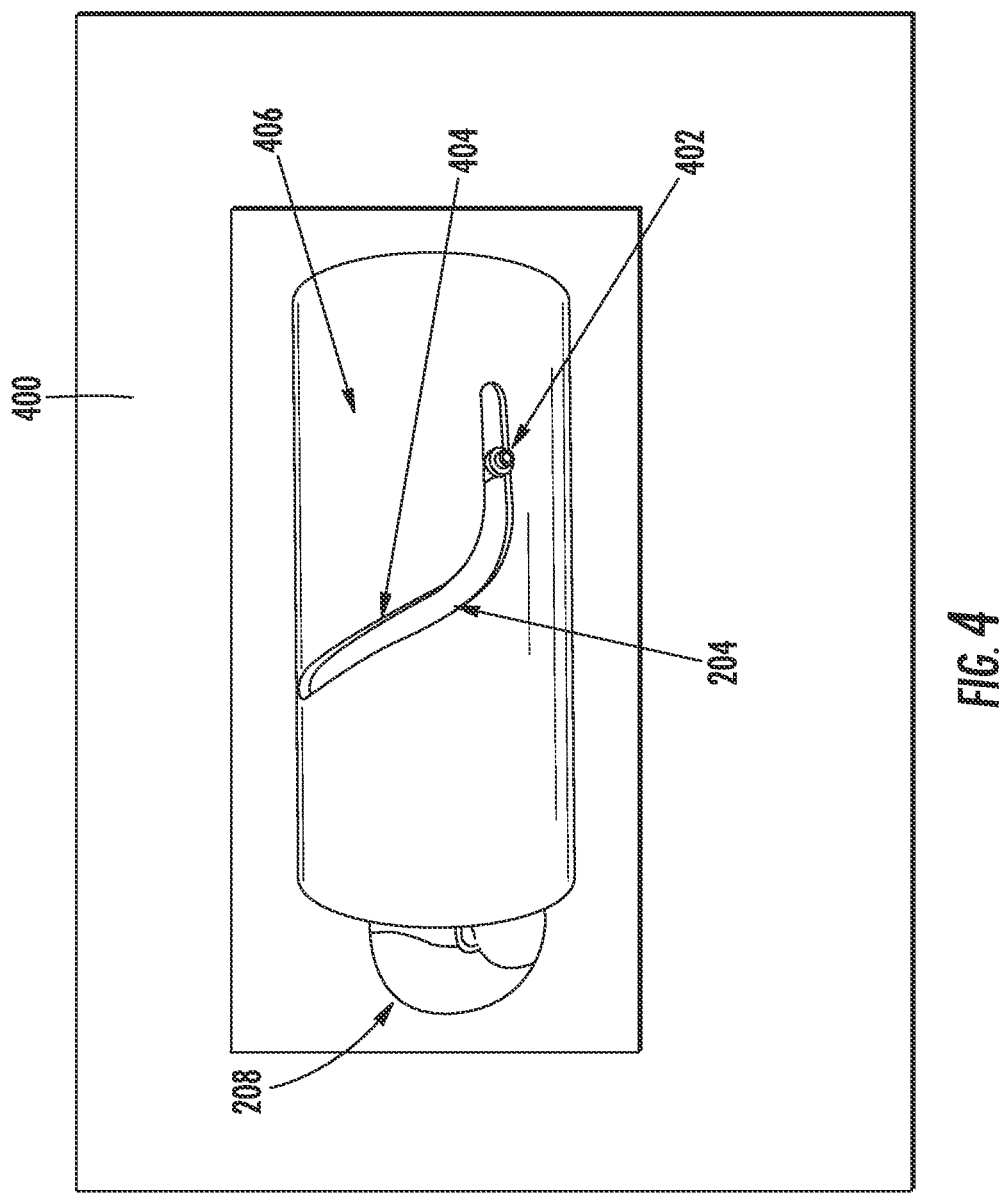
FIG. 4 is a photograph showing a portion of an example pneumatic based fetal delivery system.

Referring to FIG. 1 and FIG. 2, example FDSS's are shown. Systems 100 and 200 can be used to simulate the delivery of a fetus from stage 1 through stage 3 labor. The system has a conduit 106 sized to allow passage of a model fetus 208. The conduit 106, as shown in FIG. 4, is tubular. The system 200 also has a pneumatic actuator 202 configured to advance a model fetus 208 through the conduit 106. The systems and devices described herein can be used to simulate fetal delivery. One example method includes positioning a fetal model 208 in a simulated birth canal, for example, including the conduit 106. The fetal model 208 is advanced through the simulated birth canal using a pneumatic actuator device 202.

Optionally, systems 100 and 200 include a cradle 204 for securing the model fetus 208. The outer circumferential dimension of the cradle 204 is optionally less than the inner circumferential dimension of the conduit 106. Optionally, the pneumatic actuator 202 is operatively connected to the cradle 204. Optionally, activation of the pneumatic actuator 202 causes the cradle 204 to advance slidably through the conduit 106.

As shown in FIG. 1 and FIG. 2, an example pneumatic gas line 104 attaches to an inflatable pneumatic drive bag of the pneumatic actuator 202. A source of gas source can be attached to the gas line 104 such that gas can be delivered through the gas line 104 to the inflatable pneumatic drive bag 202. As the pneumatic drive bag 202 inflates, it forces the cradle 204 and the fetus 208 through the conduit 106.

Optionally, the distal end 108 of the conduit 106 is attachable to a pelvic outlet of an obstetrical simulator. The manifold at the end of the distal end 108 may, for example, be connected to the obstetrical simulator through twisting the distal end 108 onto an obstetrical simulator to lock the obstetrical simulator and distal end 108 together. Optionally, the distal end 108, including the manifold, of the conduit 106 is in proximity to a pelvic outlet of an obstetrical simulator. Optionally, when the pneumatic actuator 202 is activated, the pneumatic actuator 202 advances the fetus 208 towards the pelvic outlet of the obstetrical simulator.

During the second stage of labor, the fetus travels and rotates as it advances through the birth canal with contractions. The major clinical presentation initially is the delivery of fetal head, typically in either the occiput anterior or occiput posterior orientation. During the delivery of the fetal head, the fetal shoulders are oriented in the 3 o'clock and 9 o'clock positions. After delivery of the fetal head, the shoulders normally rotate into the 12 o'clock and 6 o'clock positions with the delivery of the fetal shoulders.

The FDSS can simulate this rotational progression. In addition to simulating normal birthing conditions, the FDSS is also capable of simulating pathological birthing presentations, such as shoulder dystocia positions that cause emergent conditions during delivery.

Figure 3:
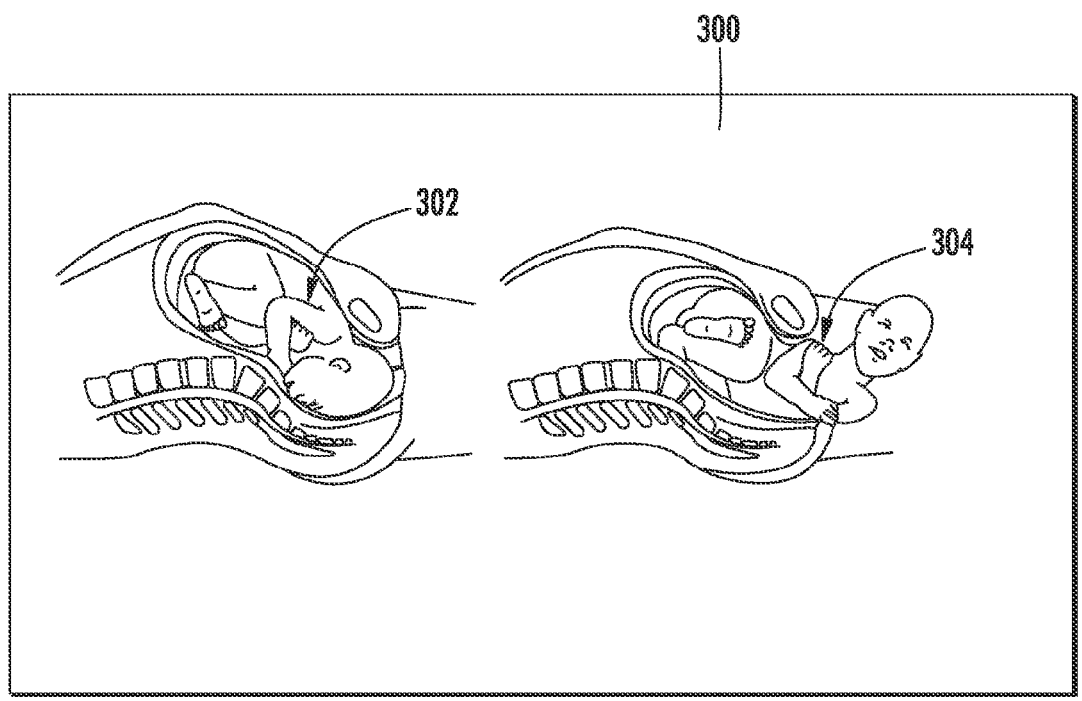
FIG. 3 is a schematic drawing showing Stage 2 rotation of a fetus during delivery.

Referring to FIG. 3, the second stage of delivery is illustrated. The fetus 302 is shown prior to delivery of the fetal head and the fetal shoulders are in the 3 o'clock and 9 o'clock positions. The fetus 304 is shown after the delivery of the fetal head, and the fetal shoulders are in the 12 o'clock and 6 o'clock positions.

The example FDSS simulates the movement through the birth canal and features a pneumatically driven fetal cradle that holds the fetus in a specific orientation. The modular fetal delivery system also simulates fetal rotation. The modular fetal delivery system further supports the simulation of a breech delivery, which is when the fetus delivers hips first rather than head first.

Referring to FIG. 4, an example system 400 is shown. System 400 optionally includes a tracking slot 404 that is defined by a conduit. The tracking slot 404 has a predetermined length and shape along the length of the conduit. The tracking slot 404 extends from an interior surface of the conduit 106 to an exterior surface of the conduit 106 and has a predetermined longitudinal and curving path. As shown in FIG. 4, the conduit 106 is tubular. Optionally, when the cradle 204 is positioned within the conduit 106, the cradle 204 further comprises a tracking protrusion 402 that is configured to extend into the tracking slot 404.

Advancement of the fetus 208 through the conduit 106 by activation of the pneumatic actuator 202 optionally causes the tracking protrusion 402 to advance through the tracking slot 404. Although a pneumatic actuator is described in this example other actuators capable of advancing a fetal model through the conduit can also be used.

Optionally, the advancement of the cradle 204 through the conduit 106 while the tracking protrusion 402 is positioned in the tracking slot 404 causes rotational movement of the cradle 204 relative to the conduit 106. Optionally, the fetus 208 is held by the cradle such that the fetus 208 rotates with the cradle 204 relative to the conduit 106.

Figure 5:
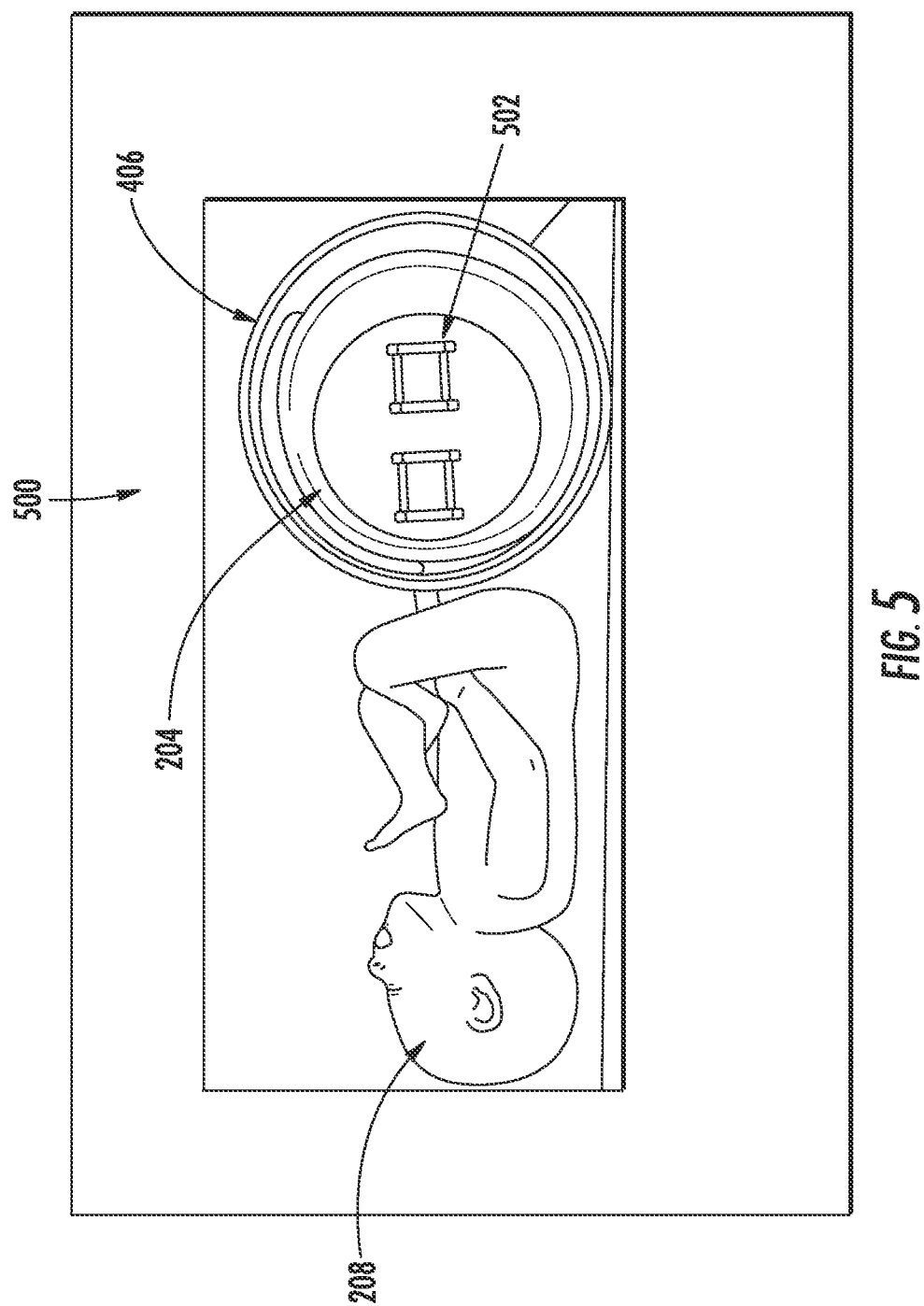
FIG. 5 is a photograph showing a portion of an example pneumatic based fetal delivery system.

As shown in FIG. 5, collapsible orientation brackets 502 hold the fetal hips in alignment as the cradle advances. The orientation brackets 502 collapse into a flat position to support simulating a breech delivery when the fetus delivers hips first rather than head first. Optionally, as the cradle 204 moves through the conduit 106 and the cradle 204 and fetus 208 rotate relative to the conduit, the shoulders of the fetus 208 rotate from the 3 o'clock and 9 o'clock positions to the 12 o'clock and 6 o'clock positions.

Also provided is a method for simulating fetal shoulder rotation during delivery. The method includes positioning a fetal model 208 in a cradle 204. The cradle 204 is positioned within a conduit 106. The conduit 106 comprises a tracking slot 404 having a predetermined length and shape along the length of the conduit 106. The cradle further includes a tracking protrusion 402 that is configured to extend into the tracking slot 404 when the cradle 204 is positioned within the conduit 106. The method further comprises the advancement of the model fetus 208 and cradle 204 through the conduit 106 to cause rotation of the shoulders of the fetal model 208.

As described above, during the birth of a fetus, an obstetrical emergency can arise resulting from shoulder dystocia. Shoulder dystocia occurs when the anterior shoulder of the fetus impinges on the maternal pubic symphysis, preventing further delivery of the fetus.

Figure 6:
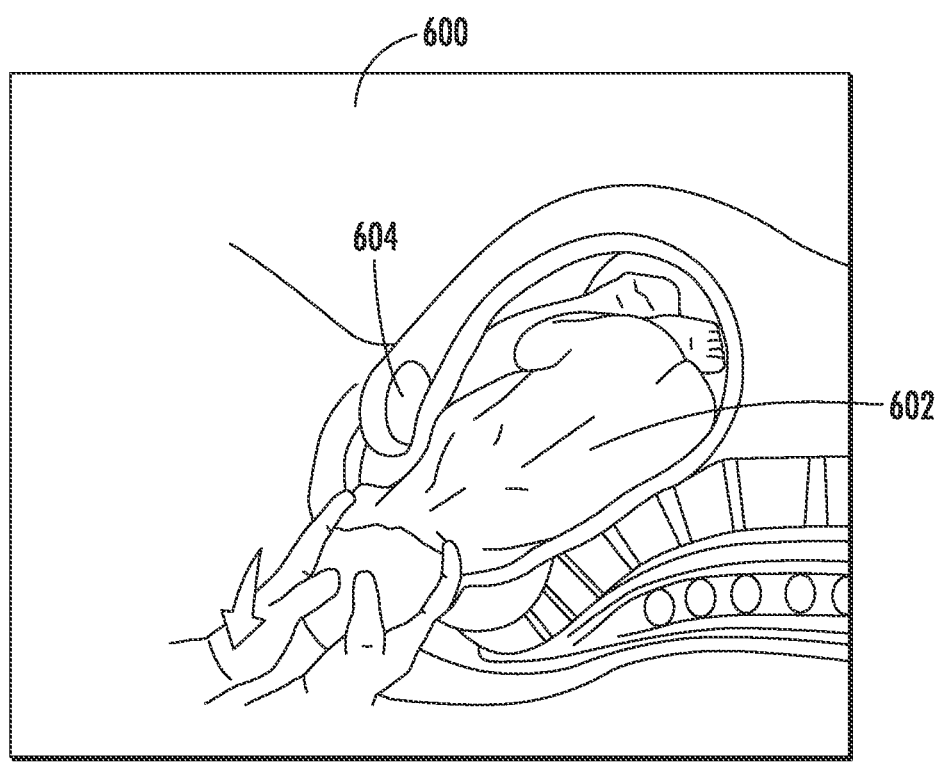
FIG. 6 is a schematic drawing of shoulder dystocia during the birth of a fetus.

Referring now to FIG. 6, an example mechanism for simulating shoulder dystocia is illustrated. Fetus 602 in FIG. 6 illustrates how the fetus's anterior shoulder impinges on the maternal pubic symphysis, which is a pathologic presentation. The FDSS can simulate shoulder dystocia by rotating the fetus and causing the fetus to impinge on the simulator's maternal pubic symphysis. Thus, the FDSS can be used to train staff in delivering fetus that must be expediently delivered under these conditions.

As related to shoulder dystocia, the "turtle sign" is a clinical sign associated with shoulder dystocia which is exhibited by partial retraction of the fetus into the birth canal with release of pulling on the fetal head. The FDSS is optionally configured to simulate the clinical "Turtle Sign."

Figure 7:
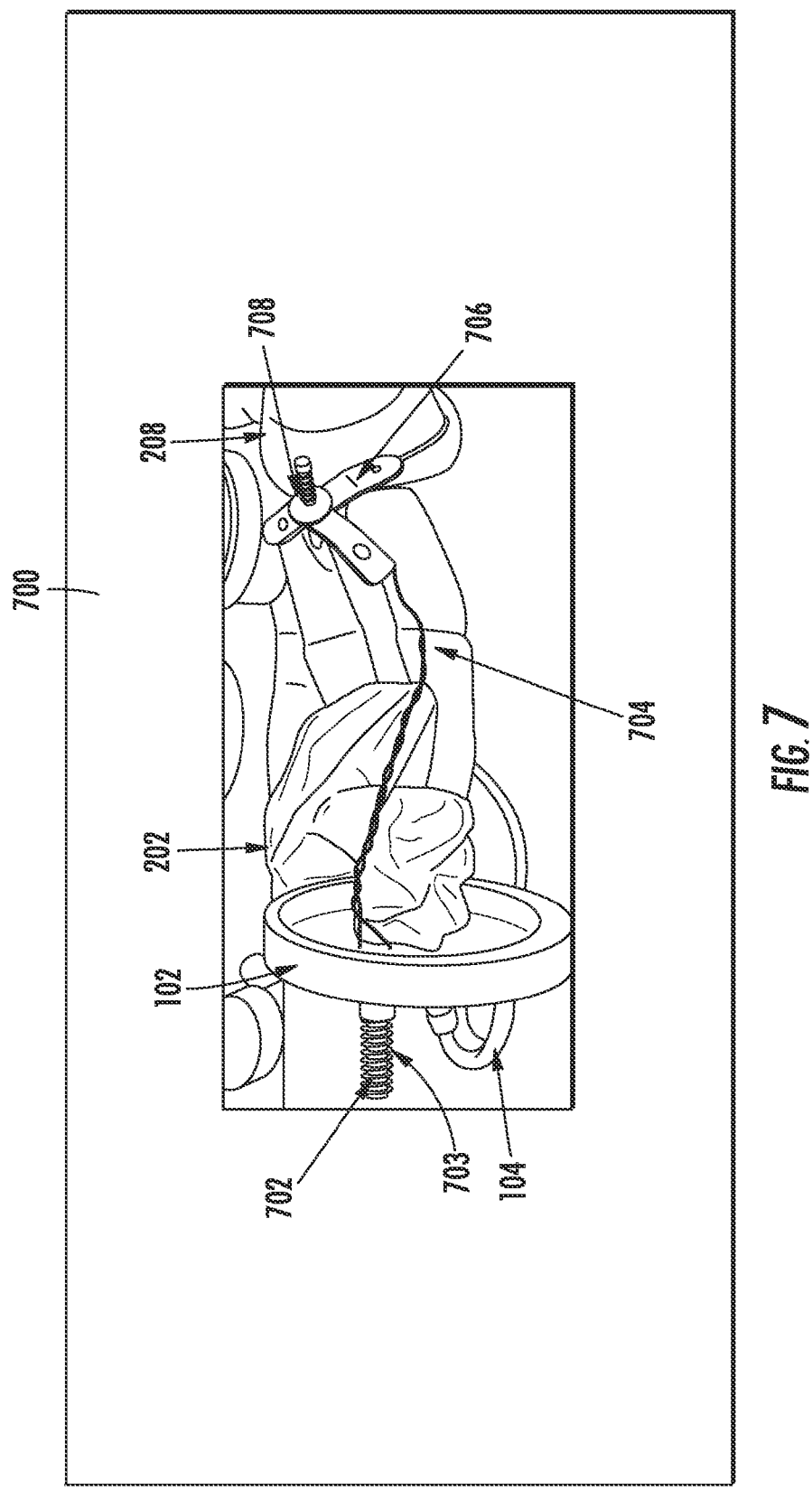
FIG. 7 is a photograph showing a portion of an example pneumatic based fetal delivery system.
Figure 8:
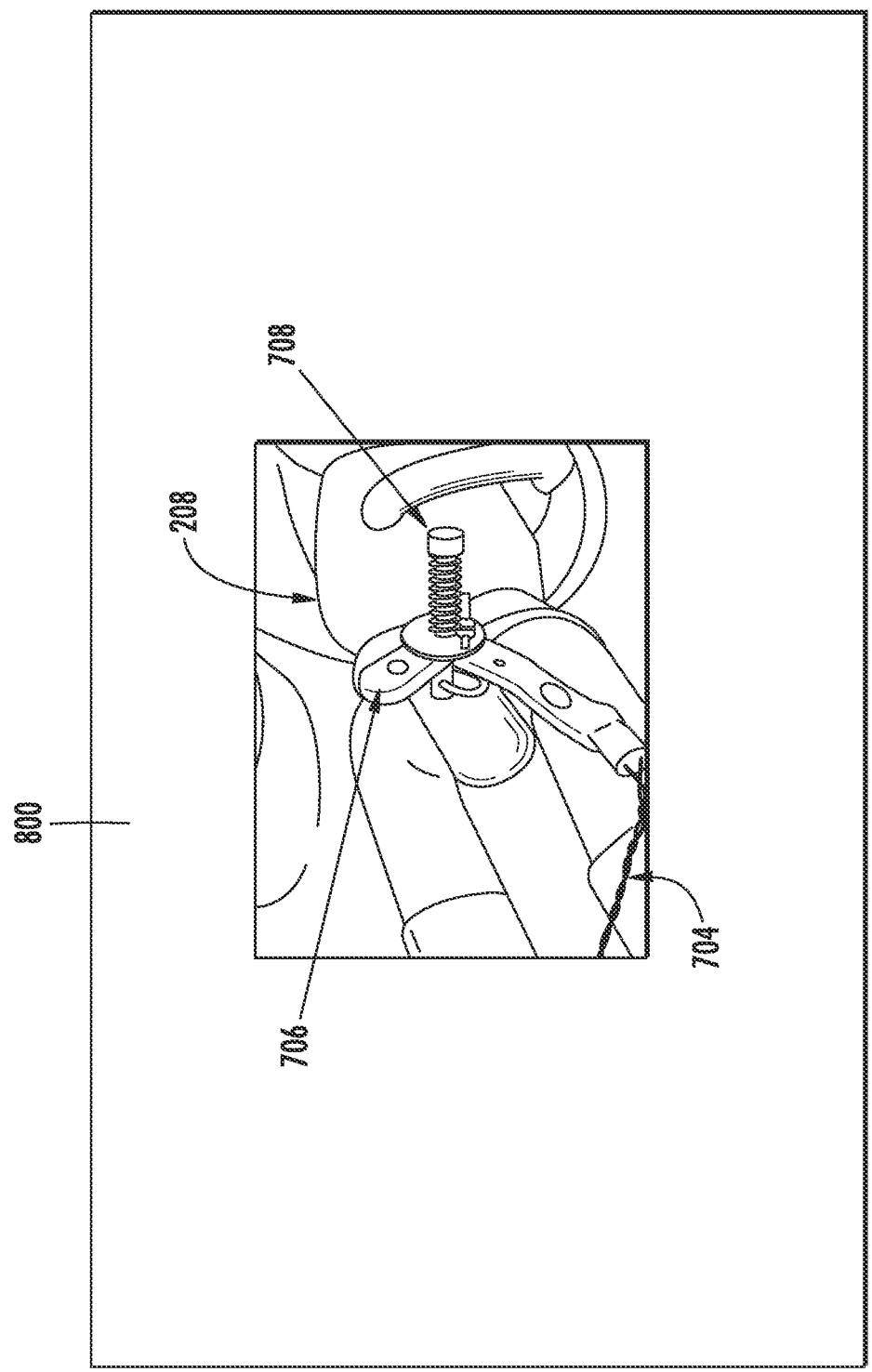
FIG. 8 is a photograph showing a portion of an example pneumatic based fetal delivery system.
Figure 9:
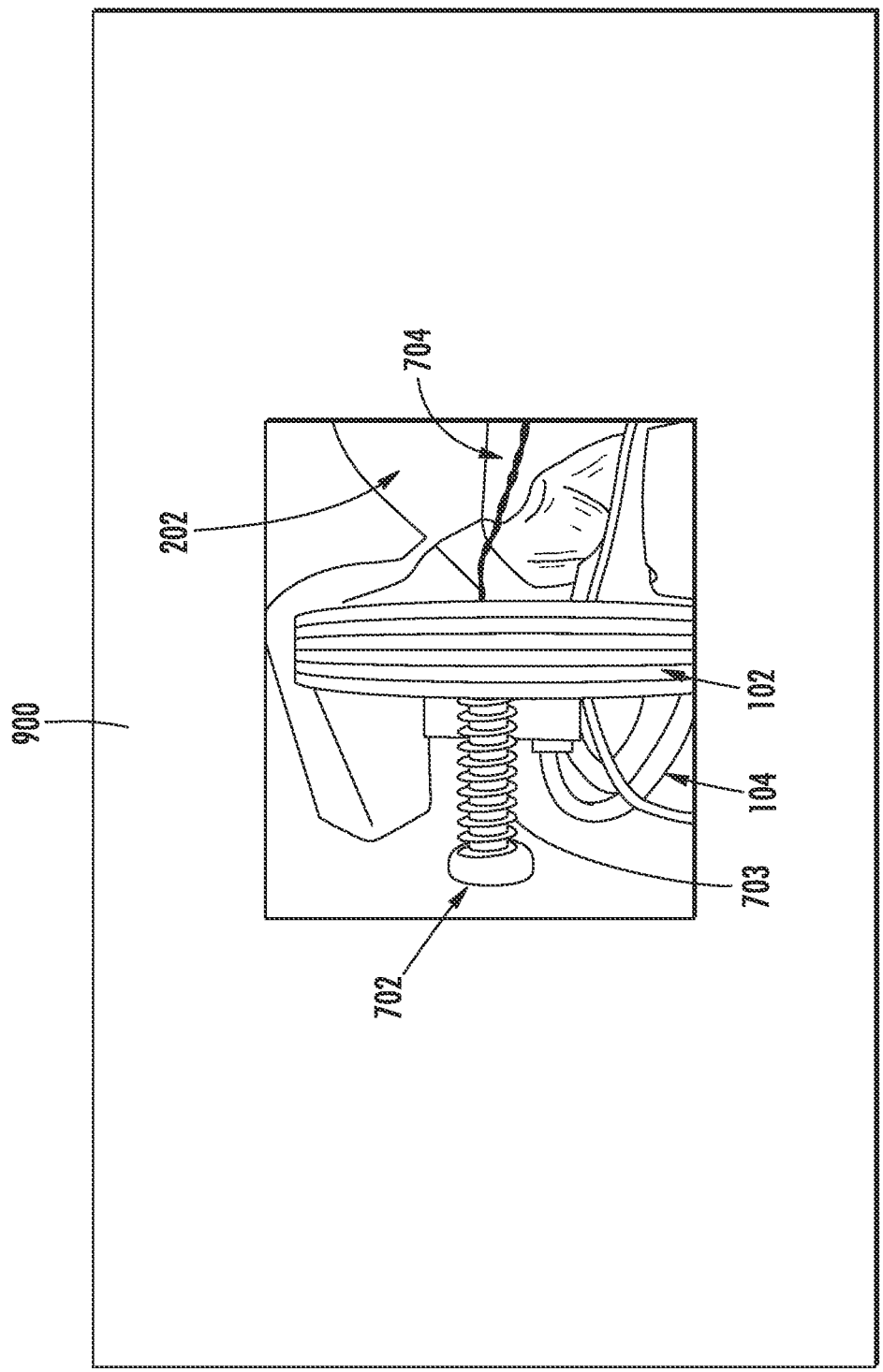
FIG. 9 is a photograph showing a portion of an example pneumatic based fetal delivery system.

Referring to FIG. 7, FIG. 8, and FIG. 9, an example system for simulating a "Turtle Sign" is shown. The FDSS includes a conduit 106 sized to allow passage of a model fetus 208. The conduit 106 includes a tracking slot 404 having a predetermined length and shape along the length of the conduit 106. The system further includes a cradle 204 for securing the model fetus 208. The cradle 204 has an outer circumferential dimension that is less than the inner circumferential dimension of the conduit 106. The cradle 204 further includes a tracking protrusion 402 that is configured to extend into the tracking slot 404 when the cradle 204 is positioned within the conduit 106. The system further has an actuator 202 configured to advance to the model fetus 208 and cradle 204 through the conduit 106.

Optionally, the actuator 202 is pneumatic. Optionally, advancement of the fetus 208 through the conduit 106 by activation of the actuator 202 causes the tracking protrusion 402 to advance through the tracking slot 404. One example of the advancement of the cradle 204 through the conduit 106 while the tracking protrusion 402 is positioned in the tracking slot 404 causes rotational movement of the cradle 204 relative to the conduit 106.

Optionally, the fetus 208 is held by the 502 collapsible orientation brackets in cradle 204 such that the fetus 208 rotates with the cradle 204 relative to the conduit 106. Optionally, as the cradle 204 moves through the conduit 106 and the cradle 204 and fetus 208 rotate relative to the conduit 106, the shoulders of the fetus 208 rotate from the 3 o'clock and 9 o'clock positions to the 12 o'clock and 6 o'clock positions.

Optionally, the FDSS further includes a tether 704 secured to the fetal model 208. For example, the tether 704 optionally attaches to pelvic harness 706 on the fetal model 208. In this example, the tether 704 runs from the pelvic harness 706 to a tether anchor 702 on the removable cap 102. Furthermore, once the tether 704 is released from the pelvic harness 706, the pelvic harness 706 remains on the infant through the remaining simulation of the birth. Optionally, the tether 704 restricts movement of the fetus 208 through the conduit 106.

In one example, the tether 704 allows delivery of at least a portion of the fetal model head but restricts delivery of the remainder of the fetal model. Optionally, the tether 704 is releasable from the fetal model 208 to allow delivery of the full fetal model, or full head of the fetal model.

Also provided in this application is a fetal delivery simulator system that includes a model fetus 208. The system further includes a simulated birth canal for passage of the model fetus there through. Further, the system has a tether 704 that is releasably secured to the fetal model 208. When the tether 704 is secured, the tether 704 prevents delivery of the full model fetus 208 from the simulated birth canal. The tether 704 attaches to pelvic harness 706 on the fetal model 208. The tether 704 runs the pelvic harness 706 to a tether anchor 702 on the removable cap 102. Furthermore, once the tether 704 is released from the pelvic harness 706, the pelvic harness 706 remains on the infant through the remaining simulation of the birth.

Optionally, the release of the tether 704 from the fetal model 208 allows delivery of the fetal model 208 from the birth canal. In one example, the tether 704 is configured to withdraw the fetal model 208 at least partially into the birth canal to simulate a turtle sign prior to release of the tether 704 from the fetal model 208. For example, the tether anchor or tether can comprise a spring mechanism that causes the withdrawal of the fetal model in a direction opposed to the delivery direction.

Also provided is a method for simulating a turtle sign during a simulated delivery. For example, the described devices and systems can be used to simulate the turtle sign. One example of the method is comprised of positioning a fetal model in a simulated birth canal. The method is further comprised of attaching a tether 704 to the fetal model 208. The tether 704 prevents full delivery of the fetal model 208 from the birth canal. The tether 704 is optimally configured to retract the fetal model 208 at least partially into the birth canal after the fetal model 208 is pulled to create tension in the tether 704.

The system may also include a sensor. The sensor is optionally configured to sense the position of the fetus 208 within the conduit 106. Optionally, a processing system is in operative communication with the sensor. The processing system is further comprised of a pneumatic actuator control module. The pneumatic actuator control module is in operative communication with the pneumatic actuator 202 to control activation of the pneumatic actuator 202.

Optionally, the processing system is configured to stop activation of the pneumatic actuator 202 when the fetus 208 is advanced to or beyond a predetermined position relative to the conduit 106.

Thus the methods, devices and systems described herein can be implemented via a processing system such as a general-purpose computing device in the form of a computer. The components of the computer can include, but are not limited to, one or more processors or processing units, a system memory, and a system bus that couples various system components including the processor to the system memory.

The system bus may represent one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus. The bus, and all buses specified in this description, can also be implemented over a wired or wireless network connection and each of the subsystems, including the processor, a mass storage device, an operating system, application software, data, a network adapter, system memory, an Input/Output Interface, a display adapter, a display device, and a human machine interface, can be contained within one or more remote computing devices at physically separate locations, connected through buses of this form, in effect implementing a fully distributed system.

The computer typically includes a variety of computer readable media. Such media can be any available media that is accessible by the computer and includes both volatile and non-volatile media, removable and non-removable media. The system memory includes computer readable media in the form of volatile memory, such as random access memory (RAM), and/or non-volatile memory, such as read only memory (ROM). The system memory typically contains data such as data and and/or program modules such as operating system and application software that are immediately accessible to and/or are presently operated on by the processing unit. The computer may also include other removable/non-removable, volatile/non-volatile computer storage media. A mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the mass storage device, including by way of example, an operating system and application software. Each of the operating system and application software (or some combination thereof) may include elements of the programming and the application software. Data can also be stored on the mass storage device. Data can be stored in any of one or more databases known in the art. Examples of such databases include, DB2®, Microsoft® Access, Microsoft® SQL Server, Oracle®, mySQL, PostgreSQL, and the like. The databases can be centralized or distributed across multiple systems. Application software may include instructions for determining and communicating the position of the model fetus in the system and for advancing the model fetus in the system.

A user can enter commands and information into the computer via an input device. Examples of such input devices include, but are not limited to, a keyboard, pointing device (e.g., a "mouse"), a microphone, a joystick, a serial port, a scanner, and the like. These and other input devices can be connected to the processing unit 226 via a human machine interface that is coupled to the system bus, but may be connected by other interface and bus structures, such as a parallel port, game port, or a universal serial bus (USB).

The computer can operate in a networked environment using logical connections to one or more remote computing devices. By way of example, a remote computing device can be a personal computer, portable computer, a server, a router, a network computer, a peer device or other common network node, and so on. Logical connections between the computer and a remote computing device can be made via a local area network (LAN) and a general wide area network (WAN). Such network connections can be through a network adapter. A network adapter can be implemented in both wired and wireless environments. Such networking environments are commonplace in offices, enterprise-wide computer networks, intranets, and the Internet.

An implementation of application software may be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data.

Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. An implementation of the disclosed method may be stored on or transmitted across some form of computer readable media.

The processing of the disclosed methods can be performed by software components. The disclosed methods may be described in the general context of computer-executable instructions, such as program modules, being executed by one or more computers or other devices. Generally, program modules include computer code, routines, programs, objects, components, data structures, etc. that perform particular tasks or implement particular abstract data types. The disclosed method may also be practiced in grid-based and distributed computing environments where tasks are performed by remote processing devices that are linked through a communications network. In a distributed computing environment, program modules may be located in both local and remote computer storage media including memory storage devices.

As previously outlined, shoulder dystocia during the delivery of a fetus is an obstetrical emergency. Specifically, shoulder dystocia can cause damage or injury to the brachial plexus. The brachial plexus is a network of nerves that originate near the neck and shoulder. These nerves begin at the spinal cord in the neck and control the hand, wrist, elbow, and shoulder. The network of nerves is fragile and can be damaged by pressure, stretching, or cutting.

Figure 10:
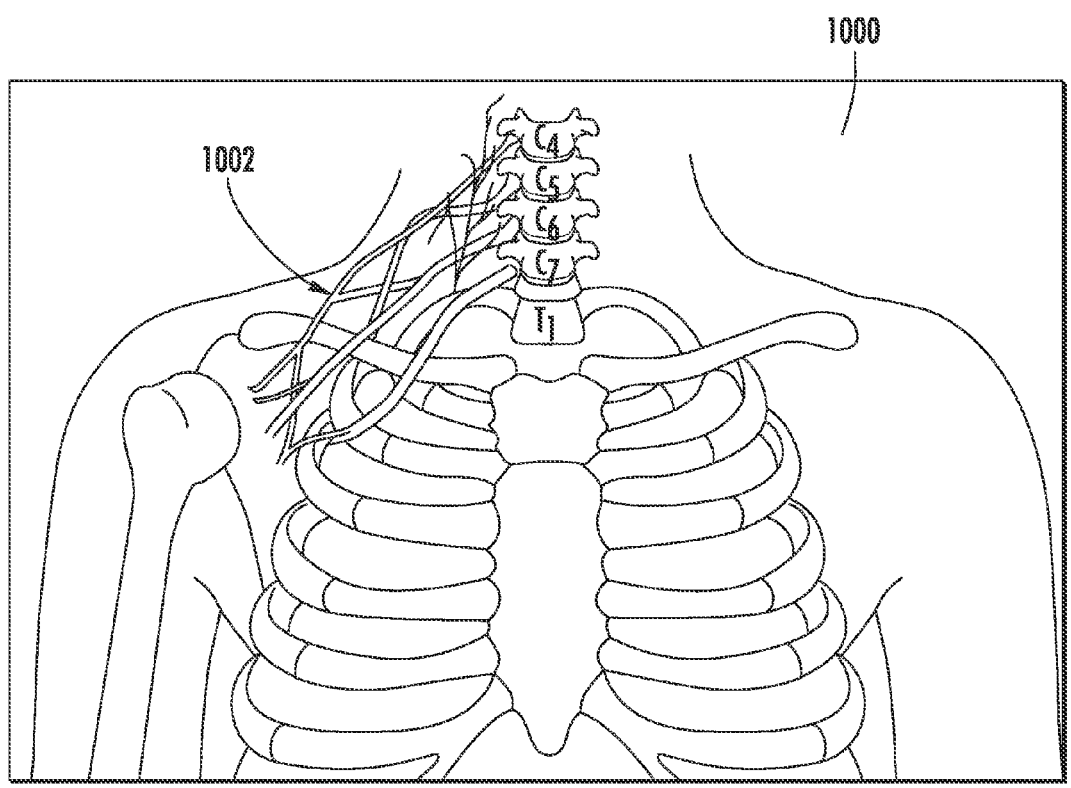
FIG. 10 is a schematic drawing of the brachial plexus.

Referring now to FIG. 10, the brachial plexus is shown. The 1002 nerves are fragile and can be damaged by pressure, stretching, or cutting. Four types of brachial plexus injuries can result. A stretching, neuropraxia, or praxis injury describes a condition where the brachial plexus nerves have been damaged but not torn. This type of injury involves a degree of swelling, bruising, compression, or over-stretching. The seriousness of this type of damage can vary widely. Neuroma, on the other hand, is a condition that results from scar tissue around the injury that prevents the nerve from communicating properly with the muscle, thus impairing movement.

A rupture injury indicates a more serious condition where the nerves are torn in one or more places, but are not detached from the spinal column. Damage is usually permanent and does not spontaneously heal. Thus, surgery is required for repair. An avulsion injury is the most serious of brachial plexus injuries, where the nerve is actually torn from the spine. The arm is thus usually completely flaccid and paralyzed. Often more than just the arm is affected with an avulsion injury. Avulsion injuries have permanently damaging consequences that last a lifetime.

In the situation of the delivery of a fetus, manipulation that may lead to damage to the brachial plexus can be monitored. A stretching injury, for example, can result when the head and neck are forced away from the shoulder, such as might happen with excessive traction during management of shoulder dystocia.

Figure 11:
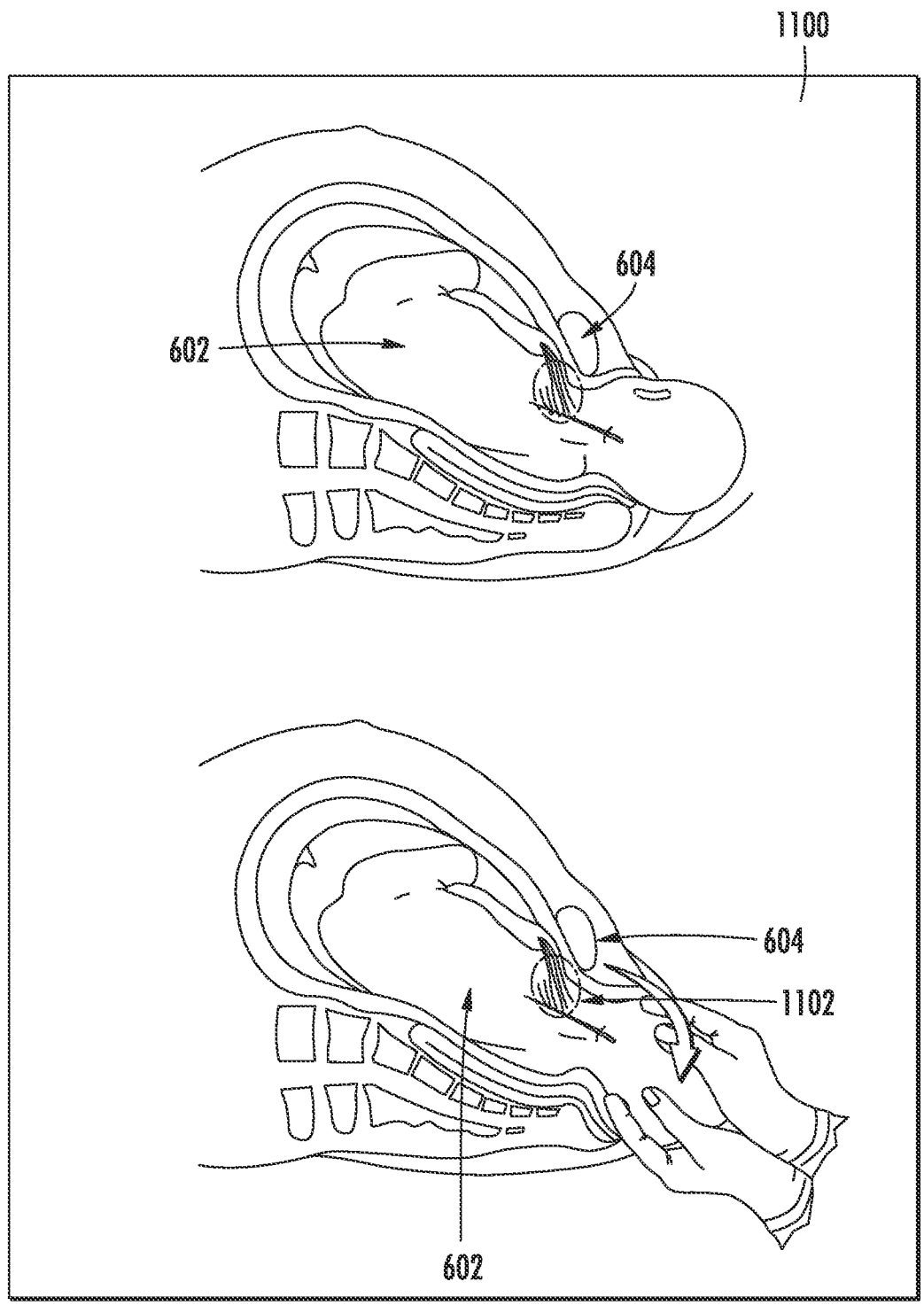
FIG. 11 is a schematic drawing of shoulder dystocia with brachial plexus injury during the birth of a fetus.

Referring now to FIG. 11, shoulder dystocia is illustrated by fetus 602 and the pubic symphysis 604. Furthermore, the 1102 injured brachial plexus on fetus 602 is shown, which has resulted from the stretching of the fetus's neck during the delivery of the fetus.

To monitor forces that may result in brachial plexus injury, a device for detecting force delivered to a simulated brachial plexus region of a fetal model with traction of a fetal model during simulated delivery is provided. The device includes a directional sensor system that measures force in the vector of the brachial plexus of the fetal model.

Optionally, the directional sensor system comprises a strain gauge configured for placement at an angle from the neck to the shoulder on a model fetus. Optionally, the directional sensor system comprises a strain gauge configured for placement at an angle from the neck to the shoulder bilaterally on a model fetus.

Also provided is a system for detecting force delivered to a simulated brachial plexus with fraction of a fetal head during simulated delivery. The system includes a device to detect force in a directional force in the vector of the brachial plexus. The system is further includes a telemetry system in operative communication with the device to detect force. The telemetry system is configured for transmitting one or more signals representing the detected force measurement. The system further includes a processing system. The processing system receives and processes the detected signal or signals to determine the force delivered to the stimulated brachial plexus in the vector of the brachial plexus. Aspects of an example processing system are described above.

A number of embodiments of the invention have been described. Nevertheless, it will be understood that various modifications may be made without departing from the spirit and scope of the invention. Accordingly, other embodiments are within the scope of the following claims.

Disclosed are materials, systems, devices, compositions, and components that can be used for, can be used in conjunction with, can be used in preparation for, or are products of the disclosed methods, systems and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a method is disclosed and discussed each and every combination and permutation of the method, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

Publications cited herein and the materials for which they are cited are hereby specifically incorporated by reference in their entireties.

What is claimed is:

1. A fetal delivery simulator system, comprising:
   a. a tubular conduit sized to allow passage of a model fetus, the tubular conduit comprising a tracking slot extending from an interior surface of the tubular conduit to an exterior surface of the tubular conduit, the tracking slot having a predetermined longitudinal and curving path;
   b. a cradle for securing the model fetus, wherein the cradle has an outer circumferential dimension that is less than the inner circumferential dimension of the tubular conduit and wherein the cradle includes a tracking protrusion that is configured to extend into the tracking slot when the cradle is positioned within the tubular conduit; and
   c. an actuator configured to advance the model fetus and cradle through the tubular conduit, wherein advancement of the cradle through the tubular conduit causes movement of the tracking protrusion along the predetermined longitudinal and curving path of the tracking slot, which guides the cradle to rotationally move relative to the tubular conduit as the model fetus is advanced.

2. The system of claim 1, wherein the actuator is pneumatic.

3. The system of claim 1, further comprising a tether secured to the fetal model that restricts movement of the fetus through the tubular conduit.

4. The system of claim 3, wherein the tether allows delivery of the fetal model head but restricts delivery of the remainder of the fetal model.

5. The system of claim 3, wherein the tether is releasable from the fetal model to allow delivery of the full fetal model.

6. The system of claim 1, wherein the distal end of the tubular conduit is attachable to or in proximity to a pelvic outlet of an obstetrical simulator.

7. The system of claim 1, further comprising a sensor that is configured to sense a position of the fetus within the tubular conduit, and a processing system in operative communication with the sensor.

8. The system of claim 7, wherein the processing system further comprises an actuator control module that is in operative communication with the actuator to control activation of the actuator.

9. The system of claim 8, wherein the processing system is configured to stop activation of the actuator when the fetus is advanced to or beyond a predetermined position relative to the tubular conduit.

10. A method for simulating fetal shoulder rotation during delivery, comprising:
    a. positioning a fetal model in a cradle;
    b. positioning the cradle within a tubular conduit wherein the tubular conduit comprises a tracking slot extending from an interior surface of the tubular conduit to an exterior surface of the tubular conduit, the tracking slot having a predetermined longitudinal and curving path and wherein the cradle includes a tracking protrusion that is configured to extend into the tracking slot when the cradle is positioned within the tubular conduit; and
    c. advancing the model fetus and cradle through the tubular conduit to cause rotation of the shoulders of the fetal model, wherein advancement of the cradle through the tubular conduit causes movement of the tracking protrusion along the predetermined longitudinal and curving path of the tracking slot, which guides the cradle to rotationally move relative to the tubular conduit as the model fetus is advanced.

* * * * *